(12) United States Patent
Lewis et al.

(10) Patent No.: US 10,975,901 B2
(45) Date of Patent: Apr. 13, 2021

(54) METHODS AND SYSTEMS FOR SLOT JOINING USING SLOT CASES

(71) Applicant: The Boeing Company, Chicago, IL (US)

(72) Inventors: Michael S. Lewis, Lake Forest Park, WA (US); Sean R. Cysewski, Snohomish, WA (US); Brad J. Reeves, Everett, WA (US); James S. Bradley, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/589,908

(22) Filed: Oct. 1, 2019

(65) Prior Publication Data
US 2020/0032827 A1    Jan. 30, 2020

Related U.S. Application Data

(63) Continuation of application No. 15/000,811, filed on Jan. 19, 2016, now Pat. No. 10,502,250.

(51) Int. Cl.
*F16B 11/00* (2006.01)
(52) U.S. Cl.
CPC .................. *F16B 11/006* (2013.01)
(58) Field of Classification Search
CPC .................. F16B 11/006; Y10T 403/477–479
See application file for complete search history.

(56) References Cited

U.S. PATENT DOCUMENTS

| 5,277,530 | A  | 1/1994  | Sweeney et al. |
| 5,427,198 | A  | 6/1995  | Walsh |
| 8,388,293 | B2 | 3/2013  | Hutter, III |
| 10,502,250 | B2 | 12/2019 | Lewis et al. |
| 2004/0011927 | A1 | 1/2004 | Christman et al. |
| 2007/0051465 | A1 | 3/2007 | Naughton et al. |
| 2007/0071572 | A1 | 3/2007 | Bohnet et al. |
| 2007/0212188 | A1 | 9/2007 | Wang et al. |
| 2008/0230172 | A1 | 9/2008 | Baebler |
| 2009/0056199 | A1 | 3/2009 | Reed |
| 2009/0100777 | A1 | 4/2009 | Guillot et al. |
| 2009/0142130 | A1 | 6/2009 | Frisch et al. |
| 2011/0236641 | A1 | 9/2011 | Brambrink et al. |

(Continued)

OTHER PUBLICATIONS

"U.S. Appl. No. 15/00,811, Notice of Allowance dated Jul. 3, 2019", 7 pages.

(Continued)

*Primary Examiner* — Daniel J Wiley
(74) *Attorney, Agent, or Firm* — Kwan & Olynick LLP

(57) ABSTRACT

Provided are methods of attaching parts using slot cases and assemblies comprising these slot cases. A slot case is inserted into a slot or slid on a tab of a first part prior to attaching it to a second part. The first part may have pores that are partially open at the surface of the slot or tab. These pores may receive adhesive while attaching the two parts. The adhesive volume going into these partially open pores may vary among different first parts. To ensure that enough adhesive is supplied between the slot case and first part, the adhesive is introduced in between these components before attaching the second part and while the slot case and first part are more accessible. The adhesive may be supplied through the bottom of the slot case and continue until the adhesive appears at the top edges of the slot case.

20 Claims, 14 Drawing Sheets

(56) References Cited

U.S. PATENT DOCUMENTS

| | | |
|---|---|---|
| 2011/0292623 A1 | 12/2011 | Stanley |
| 2013/0284343 A1 | 10/2013 | Legrand et al. |
| 2014/0068908 A1 | 3/2014 | Hickey |
| 2014/0212241 A1 | 7/2014 | Burd et al. |
| 2014/0241790 A1 | 8/2014 | Woleader et al. |
| 2015/0283956 A1 | 10/2015 | Halliwell |
| 2016/0221254 A1 | 8/2016 | Saito et al. |
| 2016/0273566 A1 | 9/2016 | Ortwein |
| 2016/0341234 A1 | 11/2016 | Germann et al. |
| 2017/0204890 A1 | 7/2017 | Lewis et al. |
| 2017/0274581 A1 | 9/2017 | Bar et al. |

OTHER PUBLICATIONS

"U.S. Appl. No. 15/000,811, Non Final Office Action dated Jan. 22, 2019", 9 pgs.

Lewis, Michael S. et al., "Panel Systems and Methods of Assembling Panel Systems", U.S. Appl. No. 14/635,508, filed Mar. 2, 2015, 27 pgs.

METHODS AND SYSTEMS FOR SLOT JOINING USING SLOT CASES

CROSS-REFERENCE TO RELATED APPLICATION

This application is a continuation of U.S. application Ser. No. 15/000,811, entitled "METHODS AND SYSTEMS FOR SLOT JOINING USING SLOT CASES," filed on 19 Jan. 2016, which is incorporated herein by reference in its entirety for all purposes.

BACKGROUND

When attaching two components with adhesive, the adhesive often needs to fill all void spaces between two components. This requirement may be driven by structural considerations, sealing considerations, and/or other considerations. In some cases, the exact amount of adhesive needed to fill all void spaces is not known because of some variations in one or both components. For example, when a slot is formed in a honeycomb composite cell structure, the slot volume may be unknown because different pores of the honeycomb structure may be open to the slot depending on the orientation of the slot and, in some cases, variations in the pores of the honeycomb structure. The conventional approach is to overfill the space, such as filling an excess amount of adhesive and followed by removal of the excess when the parts are joined. However, in some cases such as tight places, decorative surfaces, and other, removing this excess is difficult if possible at all. Determining the right amount of adhesive for bonding porous and other such structures without generating adhesive spills is desirable.

SUMMARY

Provided are methods of attaching parts using slot cases and assemblies comprising these slot cases. A slot case is inserted into a slot or slid on a tab of a first part prior to attaching it to a second part. As such, the slot case is disposed between the first part and the second part. The first part may have pores that are at least partially open and extend to the surface of the slot or tab. These pores may be filled with an adhesive used for attaching the two parts. The adhesive volume going into these partially open pores may vary among different first parts. To ensure that enough adhesive is supplied between the slot case and first part, the adhesive is introduced in between these components before attaching the second part and while the slot case and first part are more accessible. The adhesive may be supplied through the bottom of the slot case and continue until the adhesive appears at the top edges of the slot case. A second part may be inserted into the slot case or slit over the slot case, and the second adhesive may be used for attaching the second part to the slot case. The second adhesive may be the same or different than the first adhesive.

While the following description generally focuses on the first part having a slot and a second part having a tab, one having ordinary skill in the art would understand that the described methods and systems may be applied to other assemblies. For example, an assembly may include a first part having a porous tab and a second case having a slot. A lot case may be slid over this porous tab and a first adhesive may be supplied between the tab and the slot case. The process may continue with an insertion of the slot case into the slot of the second part such that a second adhesive is used for attaching the second part to the slot case. Other configurations, e.g., where both tab and slot are porous, are also within the scope and will be understood by one having ordinary skill in the art.

In some embodiments, a method of attaching a first part and a second part comprises inserting a slot case into a slot of the first part. The method may also involve supplying a first adhesive into a space between the slot case and the first part thereby filling the space. All of the first adhesive may be supplied after the slot case is inserted into the slot. Alternatively, at least some of the first adhesive may be supplied prior to inserting the slot case into the slot of the first part. The method also comprises supplying a second adhesive into the slot case and inserting a tab of the second part into the slot case. The second adhesive may be supplied into the slot case after supplying the first adhesive into the space between the slot case and the first part. The second part may be inserted after supplying the second adhesive into the slot case.

In some embodiments, the method further comprises forming the first part. Forming the first part may comprise forming the slot in the first part. For example, the slot may be machined or otherwise formed in the first part. In some embodiments, forming the first part comprises forming pores on the first part. At least a first portion of the pores may be a part of the space later filled with the first adhesive. For example, the first portion of the pores may be open to the surface of the slot.

In some embodiments, a second portion of the pores of the first part is isolated from the space between the slot case and the first part and remain unfilled with the first adhesive. The second portion of the pores may be closed pores and/or may be also positioned further away from the surface of the slot. The volume ratio of the first portion of the pores to the second portion may vary among different first parts (e.g., may have some part-to-part variations). This variation may depend on the position of the slot relative to the pores, size and distribution of the pores and other factors, which will be understood by one having ordinary skill in the art. In some embodiments, the first part has a material structure selected from the group consisting of a honeycomb and a foam.

In some embodiments, supplying the first adhesive into the space comprises forcing the first adhesive through the space between the slot case and the first part and to the top edge of the slot case. The top edge of the slot case may coincide with the surface of the first part, in some example. Supplying the first adhesive into the space may comprise supplying the first adhesive through a fill port in the bottom of the slot case or, more specifically, through the fill port in the center in the bottom of the slot case. This bottom type of adhesive filling ensures that the entire space between the slot case and the first part, including the first portion of the pores, is filled with the first adhesive.

In some embodiments, inserting the slot case into the slot of the first part comprises contacting the slot bottom surface of the slot with the bottom pads of the slot case. The bottom pads protrude from the outer bottom surface of the slot case and provide the bottom space between the outer bottom surface and the slot bottom surface. The method may comprise forming the slot case including sizing the height of the bottom pads.

In some embodiments, the method further comprises curing the first adhesive prior to supplying the second adhesive into the slot case. For example, curing the first adhesive may comprise transmitting UV radiation through the slot case. The slot case may be transparent to the UV radiation. Alternatively, the first adhesive and the second adhesive may be cured at the same time, e.g., heat cured, at the later operation. In this case, the first adhesive may remain uncured while supplying the second adhesive into the slot case and while inserting the tab of the second part into the slot case.

In some embodiments, inserting the slot case into the slot of the first part comprises extending one or more side protrusion towards to a side surface of the slot. The one or more side protrusion may prevent slipping of the slot case out of the slot and may provide more mechanical support between the slot case and the first adhesive.

In some embodiments, supplying the second adhesive comprises supplying the second adhesive to an inner bottom surface of the slot case, such as over a fill port of the slot case. The second adhesive may be different from the first adhesive. In some embodiments, inserting the tab of the second part into the slot case comprises distributing the second adhesive within in the space between the tab of the second part and the slot case. For example, the second adhesive may flow from the inner bottom surface of the slot case to the top edge of the slot case thereby filling the entire space between the tab of the second part and the slot case. In some embodiments, the volume of the second adhesive supplied into the slot case is equal to the volume of the space between the tab of the second part and the slot case. Unlike the volume of the first adhesive, the volume of the second adhesive is known precisely.

In some embodiments, the first part comprises decorative laminate prior to inserting the slot case into the first part. The decorative laminate may be easily cleaned when supplying the first adhesive since there is sufficient access to the decorative laminate at this stage of processing. At the same time, the decorative laminate may not get contaminated by the second adhesive since the volume of the second adhesive is known and this exact volume of the second adhesive may be supplied into the second case.

In some embodiments, a set of operations comprising inserting the slot case, supplying the first adhesive, supplying the second adhesive, and inserting the tab is repeated at least once. The volume of the first adhesive varies between sets of operations. At the same time, the volume of the second adhesive remains constant in all sets of operations.

Also provided is an assembly comprising a first part, a slot case, and a first adhesive. The first part comprises a slot. The slot case is inserted into the slot of the first part. The first adhesive is disposed in the space between the first part and the slot case and adheres the first part to the slot case.

In some embodiments, the assembly further comprises a second part comprising a tab inserted into the slot case. The assembly may also comprise a second adhesive disposed in the space between the second part and the slot case. The first adhesive may be different than the second adhesive.

In some embodiments, the first part comprises pores. At least a first portion of the pores is filed with the first adhesive. A second portion, which is different from the first portion, may be free from with the first adhesive. Specifically, the second portion may be closed pores and/or disposed further away from the surface of the slot than the first portion. The first part may have a material structure selected from the group consisting of a honeycomb, a foam, and TBD. In some embodiments, substantially all of the space between the slot case and the first part is filled with the first adhesive. The filled space includes the first portion of the pores.

In some embodiments, the bottom of the slot case comprises a fill port. The fill port may be disposed in the center of the bottom of the slot case. The slot case may comprise the bottom pads contacting a slot bottom surface of the slot.

The slot case may comprise a UV transparent material. The slot case may comprise one or more protrusion extending towards to a side surface of the slot.

These and other embodiments are described further below with reference to the figures.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Figure 1:
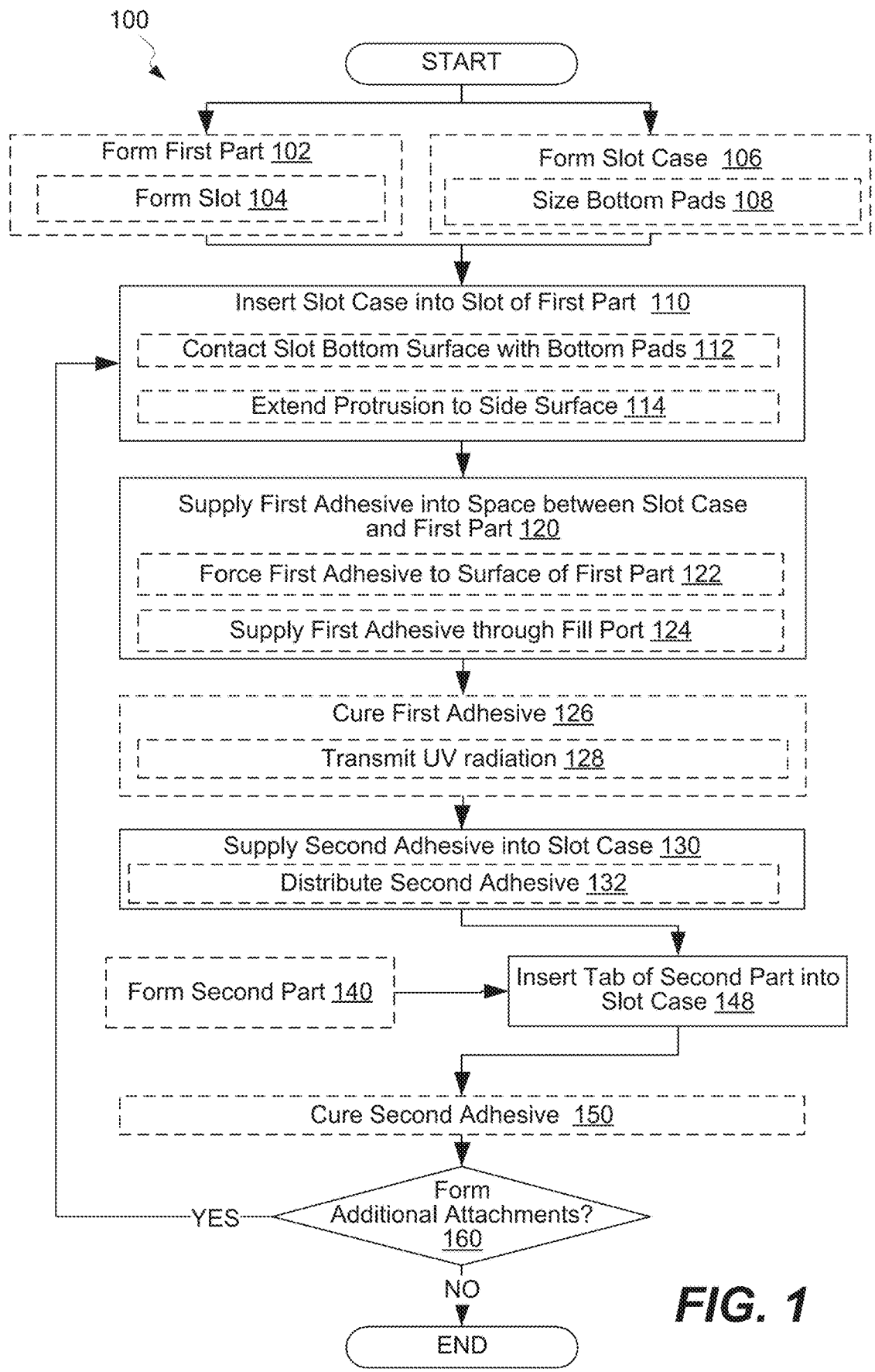
FIG. 1 is a process flowchart corresponding to a method of attaching a first part to a second part using a slot case, in accordance with some embodiments.

FIG. 1 is a process flowchart corresponding to method 100 of attaching first part 200 to second part 700 using slot case 300, in accordance with some embodiments. Method 100 may involve supplying second adhesive 600 into slot case 300 provided in slot 210 of first part 200 and inserting tab 710 of second part 700 into slot case 300 containing second adhesive 600. Slot case 300 may be inserted into slot 210 and adhered to first part 200 in a separate process. Alternatively, method 100 may also involve inserting slot case 300 into slot 210 of first part 200 and supplying first adhesive 500 into space 400 between slot case 300 and first part 200 thereby filling this space 400. One having ordinary skill in the art would understand various options associated with method 100. Various examples of operations and components used in these operations will now be described in more detail.

Figure 2A:
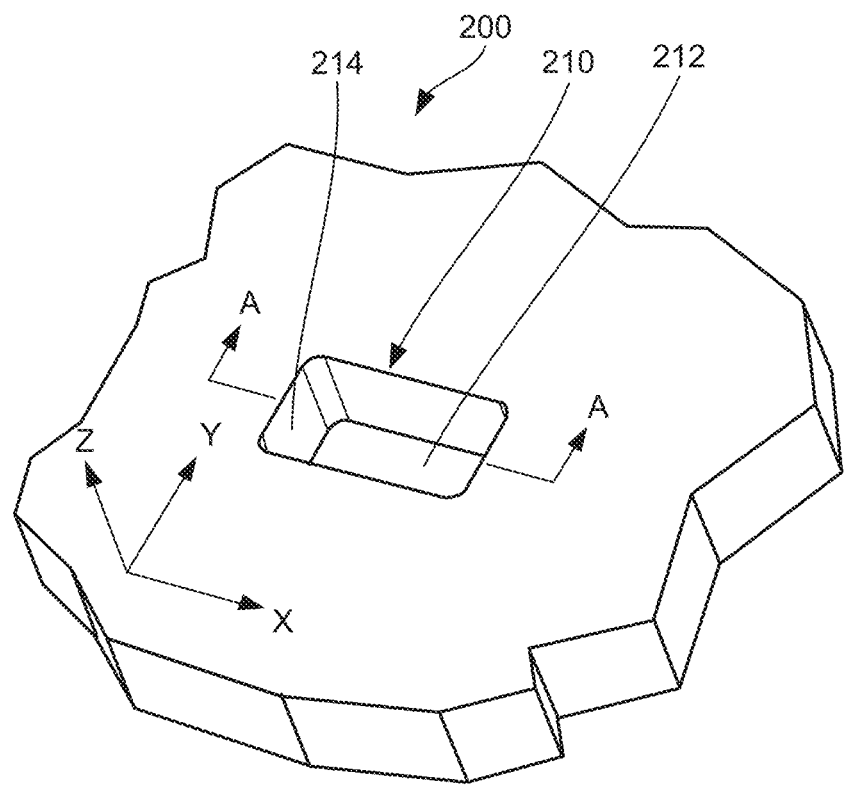
FIG. 2A is a perspective view of a first part comprising a slot, in accordance with some embodiments.
Figure 2B:
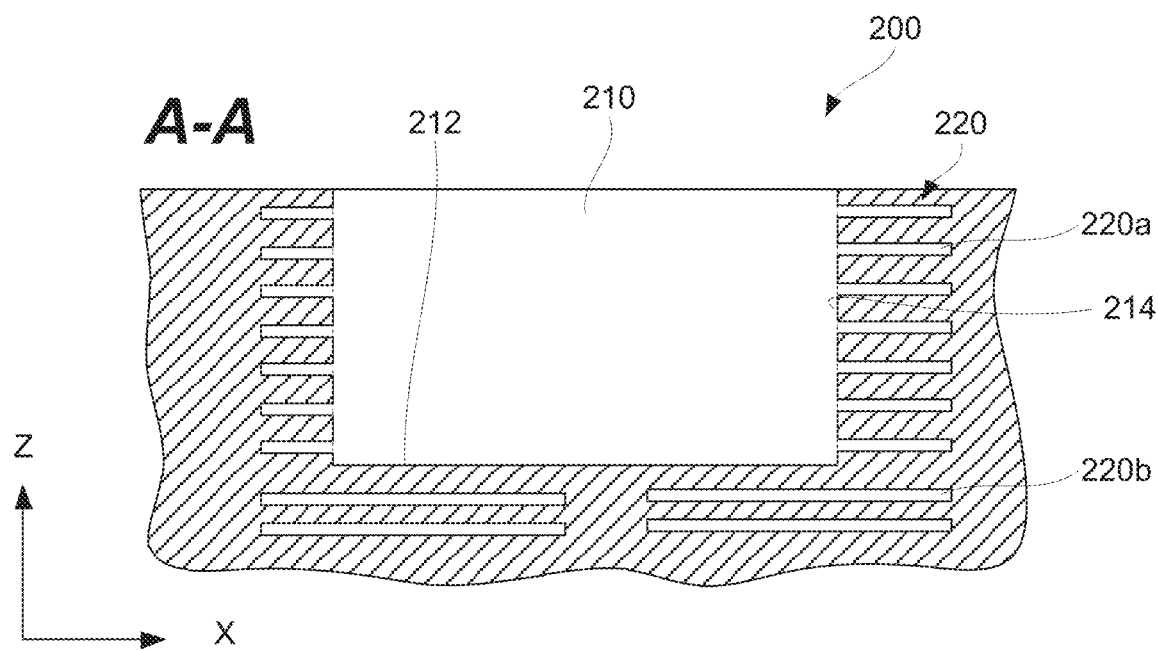
FIGS. 2B and 2C are section cut views of two examples of the first part shown in FIG. 2A, in accordance with some embodiments.
Figure 2C:
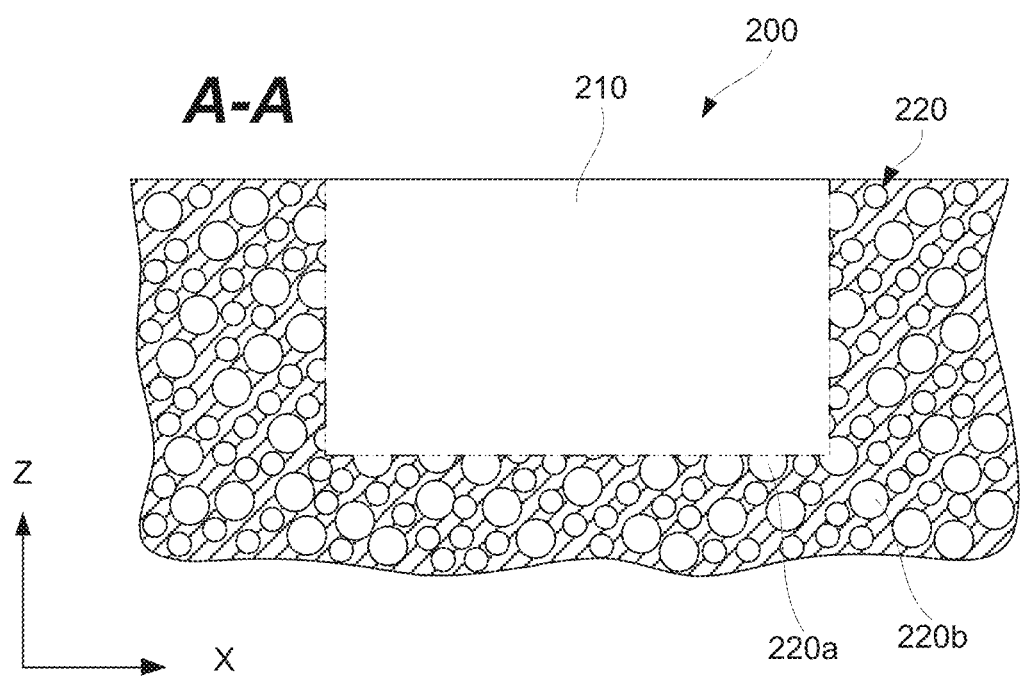

FIG. 2A is a perspective view of first part 200 comprising slot 210, in accordance with some embodiments. FIGS. 2B and 2C are section cut views of two examples of first part 200 shown in FIG. 2A, in accordance with some embodiments. As shown in FIGS. 2B and 2C, first part 200 may include pores 220. Some of these pores 220, which may be referred to as first portion 220a, are open to slot 210. Other pores 220, which may be referred to as second portion 220b, are closed to slot 210. In other words, first portion 220a of pores 220 is in fluid communication with slot 210, while second portion 220b of pores 220 is not in fluid communication with slot 210. As such, when slot 210 is filled with adhesive (as further describes below with reference to FIGS. 5A-5B) first portion 220a of pores 220 may be filled with first adhesive 500. At the same time, second portion 220b of pores 220 may remain substantially free from first adhesive 500. As such, first portion 220a of pores 220 is a part of slot 210 and later a part of space 400 (as shown in FIG. 4), while second portion 220b of pores 220 is isolated from slow 210 and later from space 400. Second portion 220b of pores 220 may be closed pores and may be also positioned further away from surface of slot 210. For purposes of this disclosure, a pore is any opening, void, or empty space that is outside of the boundary of slot 210.

The volume ratio of first portion 220a of pores 220 to second portion 220b may vary among different first parts. More specifically, the volume of first portion 220a of pores may vary. In other words, there may be some part-to-part variation. This may depend on position of slot 210 relative to pores 220, size and distribution or pores 220 within first part 200, and other factors, which will be understood by one having ordinary skill in art. As such, determining the amount of first adhesive 500 needed to fill first portion 220a of pores 220 may not be possible even though the remaining volume of space 400 between slot case 300 and first part 200 may be known. As such, first adhesive 500 may be supplied into space 400 between slot case 300 and first part 200 until all space including first portion 220a of pores 220 is filled with first adhesive 500. At the same time, it may not be desirable to have any excess adhesive outside of space 400 between slot case 300 and first part 200 especially when second part 700 is installed or being installed. This excessive adhesive may be difficult to clean, for example.

In some embodiments, first part 200 comprising pores 220 has a material structure selected from group consisting of a honeycomb, a foam, and the like. The materials of first part 200 may be ceramic, plastic, metal, or any other suitable material.

In some embodiments, method 100 comprises forming first part 200 during optional operation 102. Operation 102 is optional because this operation may be a part of a separate process, for example. Forming first part 200 may comprise forming slot 210 in first part 200 during optional operation 104. For example, slot 210 may be machined or otherwise formed in first part 200. In some embodiments, forming first part 200 comprises forming pores 220 on first part 200.

Figure 4A:
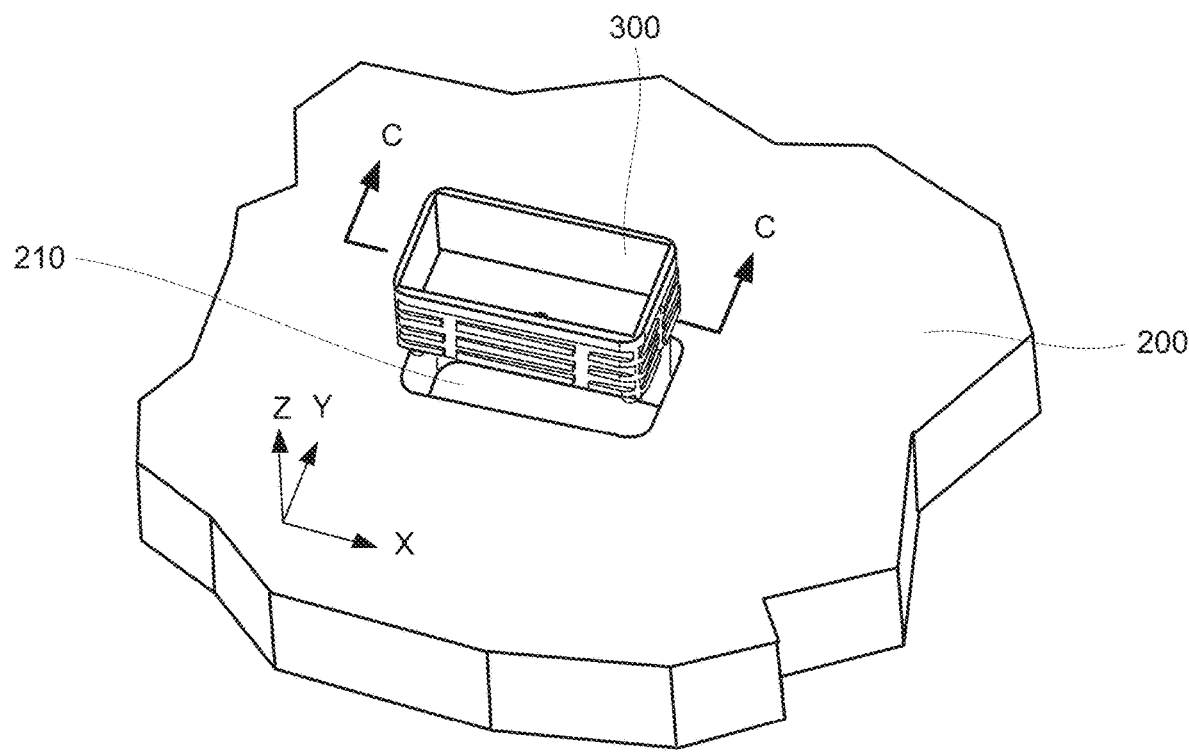
FIG. 4A is a perspective view of the slot case shown in FIGS. 3A-3B partially inserted into the slot of the first part shown in FIGS. 2A-2C, in accordance with some embodiments.
Figure 4B:
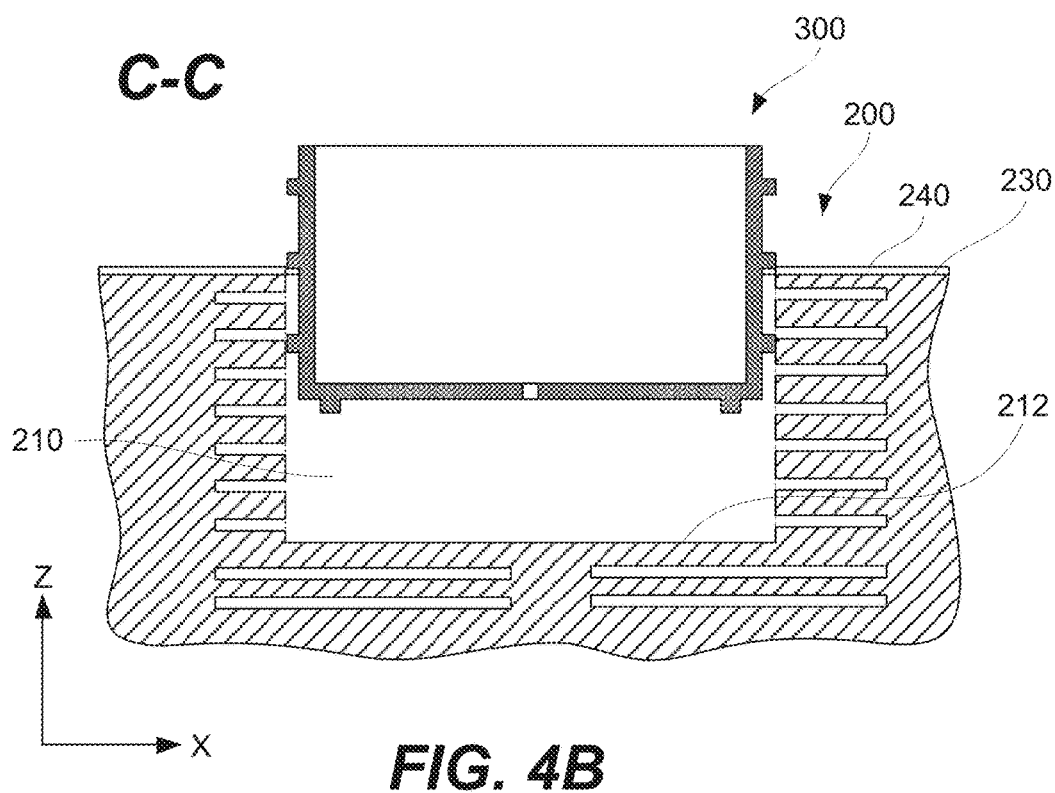
FIG. 4B is a section cut view of the slot case shown in FIGS. 3A-3B partially inserted into the slot of the first part shown in FIGS. 2A-2C, in accordance with some embodiments.

Method 100 may involve inserting slot case 300 into slot 210 of first part 200 during operation 110. FIG. 4A is a perspective view of slot case 300 partially inserted into slot 210, while FIG. 4B is a section cut view of the same stage. Slot case 300 may be slid into slot 210. It should be noted that slot 210 may be free from first adhesive 500 at this operation. First adhesive 500 may be supplied into space 400 between slot case 300 and first part 200 after completing operation 110.

Figure 3A:
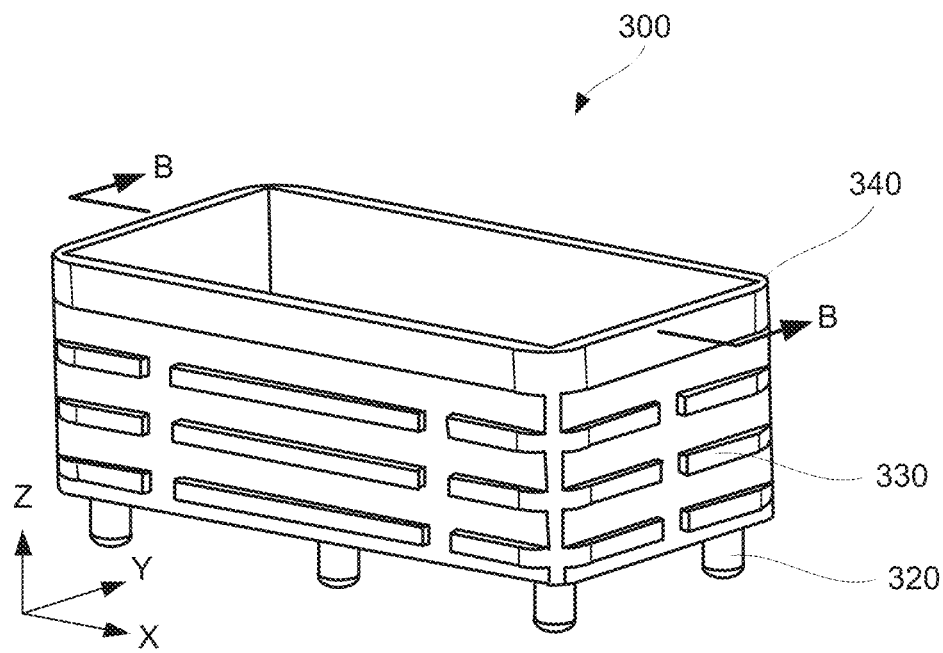
FIG. 3A is a perspective view of a slot case, in accordance with some embodiments.
Figure 3B:
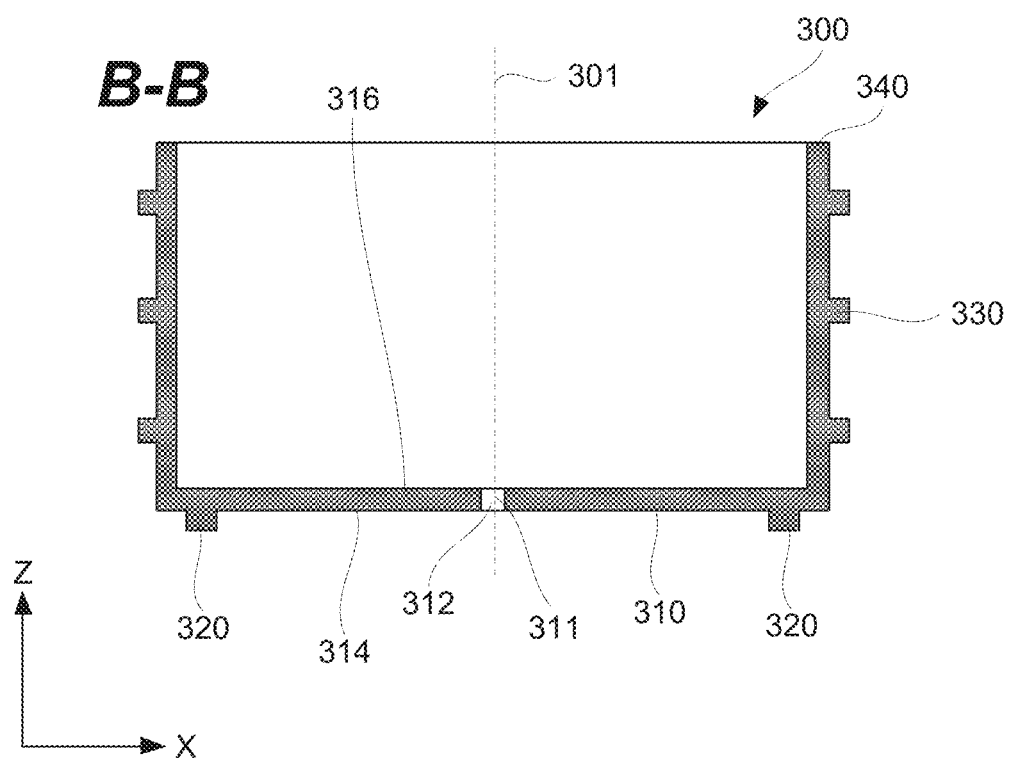
FIG. 3B is a section cut view of the slot case shown in FIG. 3A, in accordance with some embodiments.

Various examples of slot case 300 will now be described. FIG. 3A is a perspective view of slot case 300 showing side protrusions 330 and bottom pads 320, in accordance with some embodiments. FIG. 3B is a section cut view of slot case 300 shown in FIG. 3A, in accordance with some embodiments. In addition to side protrusions 330 and bottom pads 320, FIG. 3A also illustrates inner bottom surface 316, outer bottom surface 314, and fill port 312. Side protrusions 330 and/or bottom pads 320 may be used for orienting slot case 300 within slot 210 of first part 200, e.g., after completing operation 110. For example, bottom pads 320 may be used to ensure sufficient space between outer bottom surface 314 and slot bottom surface 212 for first adhesive 500 to flow in that space. Likewise, side protrusions 330 may be used to provide space between side walls of slot 210 and slot case 300. While side protrusions 330 are shown in FIG. 3A to extend substantially parallel to the X-Y plane, other orientations of side protrusions 330 are also within this scope. For example, side protrusions 330 may extend substantially parallel to the Z axis or at some angle less than 90° or even less than 45° relative to the Z axis. Regardless of the orientation of side protrusions 330, the is path for adhesive to flow past these protrusions from bottom 310 and to top edge 340. For example, horizontal side protrusions 330 shown in FIG. 3A have gaps between these protrusions to allow to adhesive to flow along the Z axis. In some embodiments, side protrusions 330 and/or bottom pads 320 may be used to provide additional mechanical bonding between slot 210 and slot case 300 through first adhesive 500.

Figure 3C:
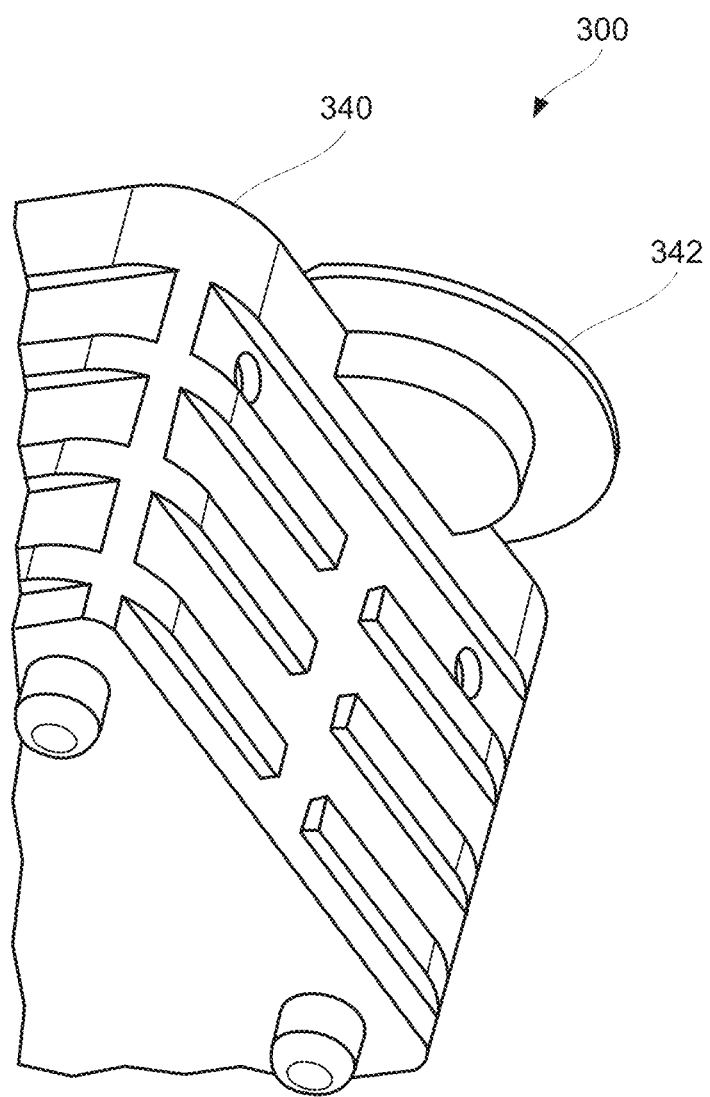
FIG. 3C is a perspective bottom view of a slot case showing an alignment feature, in accordance with some embodiments.

In some embodiments, slot case 300 may include alignment feature 342 as, for example, shown in FIG. 3C. Alignment feature 342 may be in a form of a flange that protrudes into a recess on surface 230 of first part 200 to determine orientation of slow case 300 with respect to first part 200 during processing. Alignment feature 342 may be used instead of or in additional to side protrusions 330 and/or bottom pads 320.

In some embodiments, method 100 also comprises forming slot case 300 during optional operation 106. For example, slot case 300 may be injection molded, machined, or formed using any other suitable operation. Some examples of materials for slot case 300 include, but not limited to, plastics, metals, ceramics, and the like. The material of slot case 300 is non-porous to ensure a controlled volume within the cavity of slot case 300. The material of slot case 300 may be selected to ensure binding to both first adhesive 500 and second adhesive 600. Specifically, addition of slot case 300 allows using different first adhesive 500 and second adhesive 600. First adhesive 500 may be selected to ensure binding to slot case 300 and first part 200 while ignoring binding considerations to second part 700. Second adhesive 600 may be selected to ensure binding to slot case 300 and second part 700 while ignoring binding considerations to first part 200. This approach also allows indirectly binding first part 200 and second part 700 that, for example, cannot be bound directly.

Furthermore, operation 106 may involve sizing the height of bottom pads 320 during optional operation 108. In some embodiments, bottom pads 320 may have a height of between about 0.5 millimeters and 10 millimeters or, more specifically, between about 1 millimeter and 5 millimeters. This height may depend on the size of bottom 310 of slot case 300 (e.g., length and width of bottom 310), flow characteristics of first adhesive 500, processing parameters while supplying first adhesive 500, and other factors.

In some embodiments, inserting slot case 300 into slot 210 of first part 200 comprises contacting slot bottom surface 212 of slot 210 with bottom pads 320 of slot case 300 during optional operation 112. Bottom pads 320 protrude from outer bottom surface 314 of slot case 300 and provide bottom space 400 between outer bottom surface 314 and slot bottom surface 212 as noted above.

In some embodiments, inserting slot case 300 into slot 210 of first part 200 comprises extending one or more protrusion 330 towards to a side surface 214 of slot 210 during optional operation 114. As noted above, one or more protrusion 330 may help to prevent slipping of slot case 300 out of slot 210 and provide more mechanical support between slot case 300 and first adhesive 500 when, for example, protrusion 330 surrounded by first adhesive 500. Furthermore, prior to filling first adhesive 500, protrusions may contact side surface 214 of slot 210 and have some degree of frictional support within slot 210.

In some embodiments, first part 200 comprises decorative laminate 240 prior to inserting slot case 300 into first part 200 as, for example, schematically shown in FIG. 4B. In a final assembly, decorative laminate 240 is visible and its surface should be kept free from residual adhesive. Decorative laminate 240 may be easily cleaned when supplying first adhesive 500 because there is still sufficient access to decorative laminate 240 at this stage of processing. At same time, decorative laminate 240 may not get contaminated by second adhesive 600 since the volume of second adhesive 600 is known and this exact volume of second adhesive 600 is supplied into slot case 300. Specifically, the volume of second adhesive 600 supplied into slot case 300 is precisely controlled. When second adhesive 600 is distributed within the space between slot case 300 and second part 700 (as further described below with reference to FIG. 7D), the amount of second adhesive 600 is not enough to generate the spills (or "squeeze-out") onto decorative laminate 240.

Figure 4C:
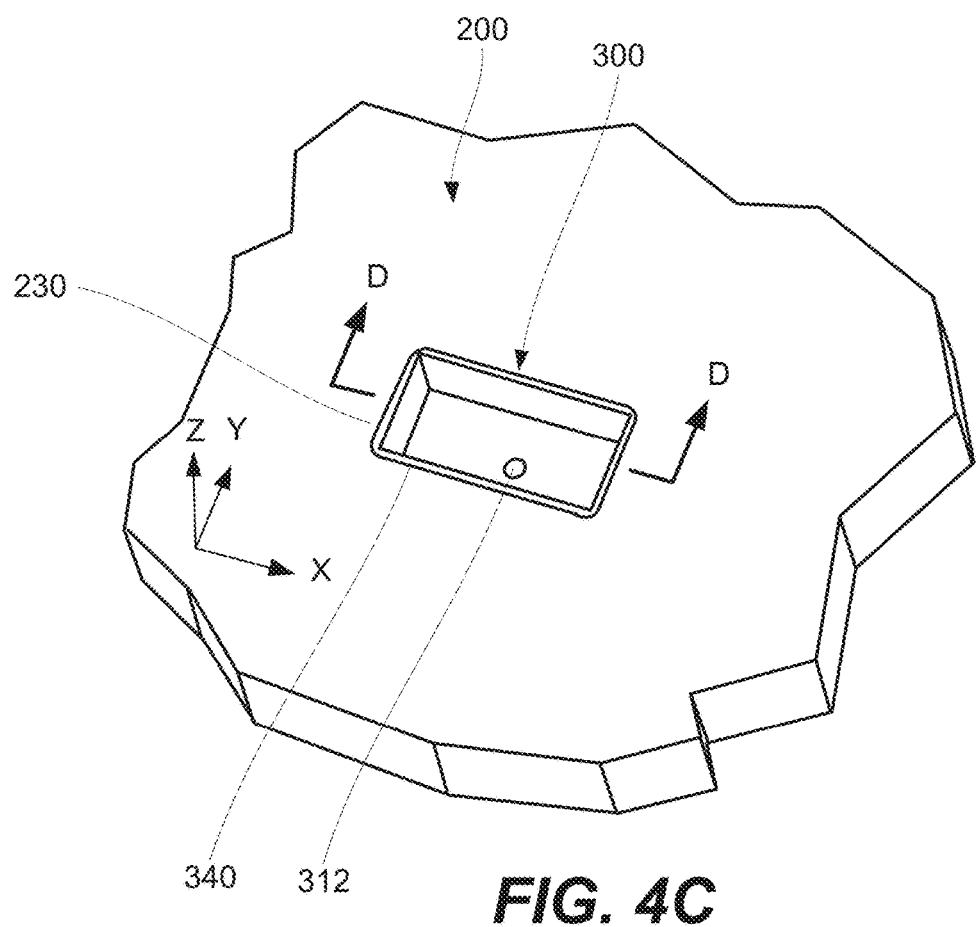
FIG. 4C is a perspective view of the slot case shown in FIGS. 3A-3B fully inserted into the slot of the first part shown in FIGS. 2A-2C, in accordance with some embodiments.
Figure 4D:
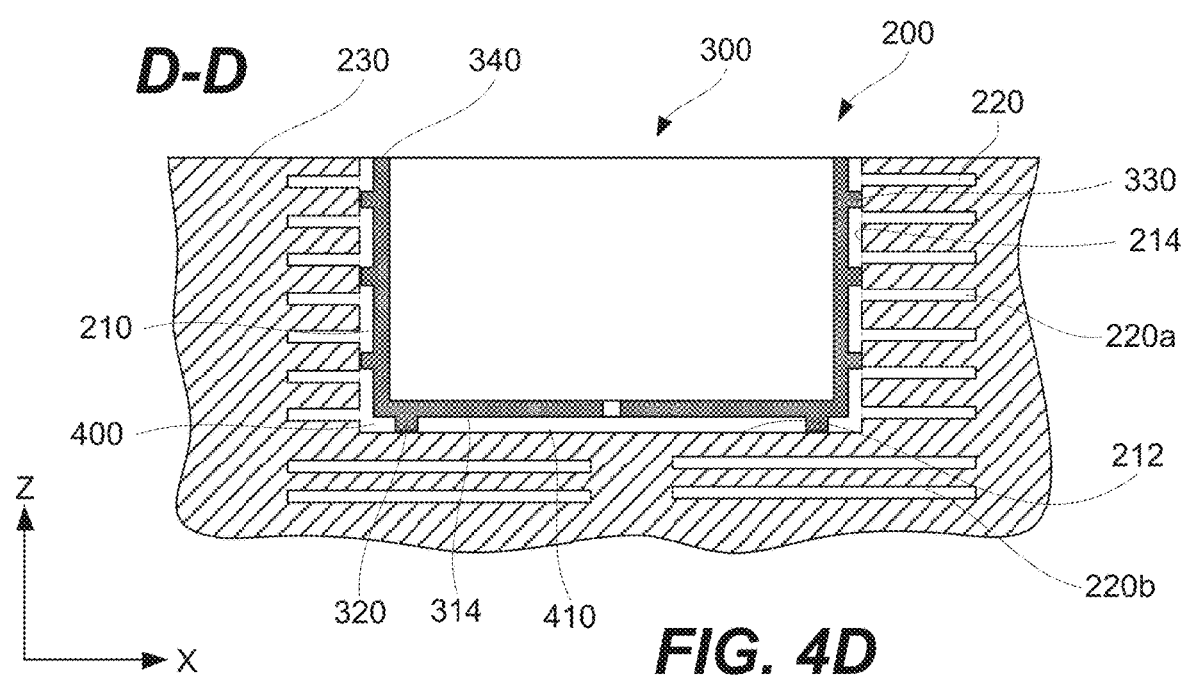
FIG. 4D is a section cut view of the slot case shown in FIGS. 3A-3B fully inserted into the slot of the first part shown in FIGS. 2A-2C, in accordance with some embodiments.

FIG. 4C is a perspective view of slot case 300 fully inserted into slot 210 of first part 200 while FIG. 4D is a section cut view of the same stage. These figures show surface 230 of first part aligned with top edge 340 of slot case 300. Furthermore, the figures illustrate first portion 220a of pores 220 being a part of space 400 while second portion 220b of pores 220 being isolated from space 400.

Method 100 may involve supplying first adhesive 500 into space 400 between slot case 300 and first part 200 thereby filling space 400 during operation 120. First adhesive 500 may be all supplied after slot case 300 is inserted into slot 210, e.g., after operation 110 is completed. Alternatively, at least some of first adhesive 500 may be supplied prior to inserting slot case 300 into slot 210 of first part 200, e.g., prior to operation 110. In this latter case, additional first adhesive 500 may be supplied into space 400 after slot case 300 is inserted into slot 210 to ensure that the entire space 400 is filled with adhesive.

Figure 5A:
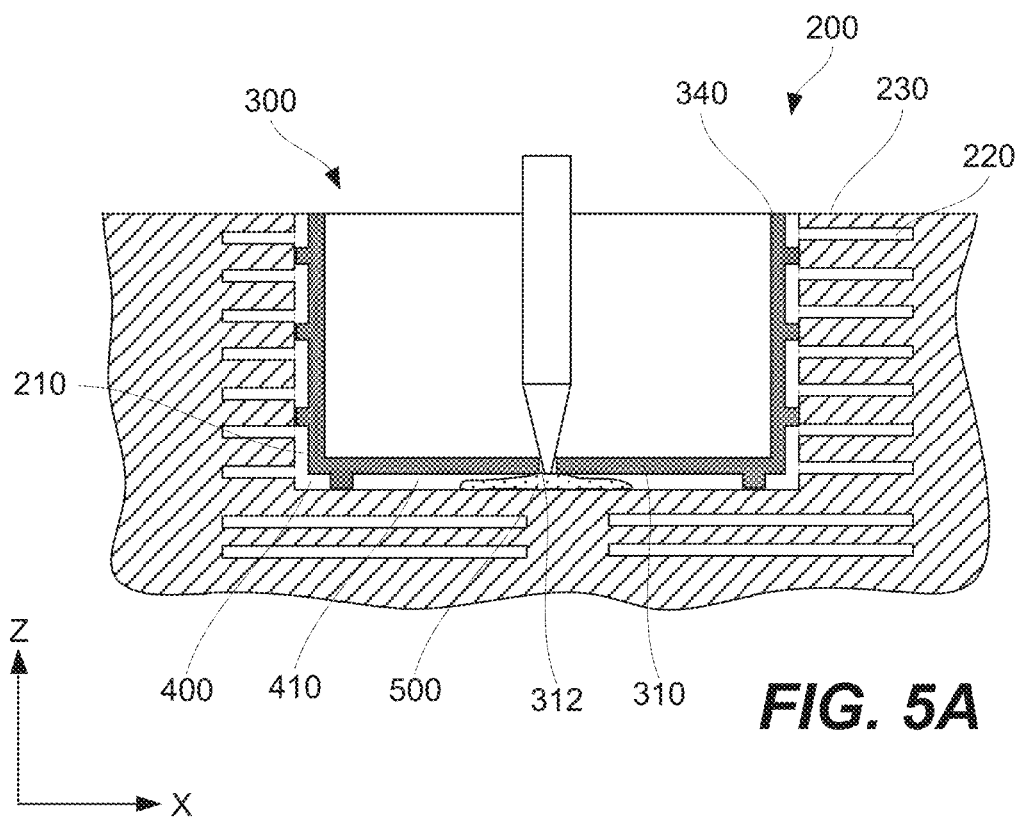
FIG. 5A is a section cut view of the slot case inserted into the slot of the first part with a space between the slot case and the first part being partially filled with a first adhesive, in accordance with some embodiments.

FIG. 5A is a section cut view of slot case 300 inserted into slot 210 of first part 200 with space 400 between slot case 300 and first part 200 being partially filled with first adhesive 500, in accordance with some embodiments. As shown in this figure, supplying first adhesive 500 into space 400 may comprise supplying first adhesive 500 through fill port 312 in bottom 310 of slot case 300 or, more specifically, through fill port 312 in center 311 in bottom 310 of slot case 300. This type of filling ensures that the entire space 400 between slot case 300 and first part 200, including first portion 220a of pores 220, is filled with first adhesive 500. Specifically, fill port 312 may be the point on slot case that is farthest away from top edge 340 of slot case 300.

Figure 5B:
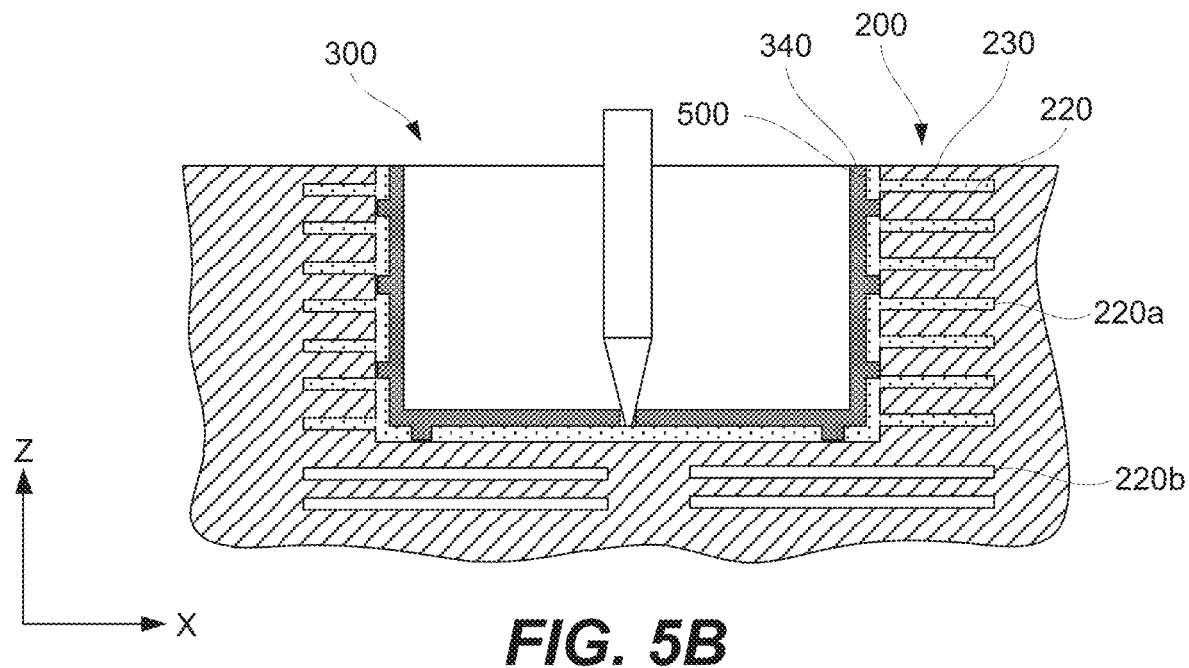
FIG. 5B is a section cut view of the slot case inserted into the slot of the first part with a space between the slot case and the first part being fully filled with the first adhesive, in accordance with some embodiments.
Figure 5C:
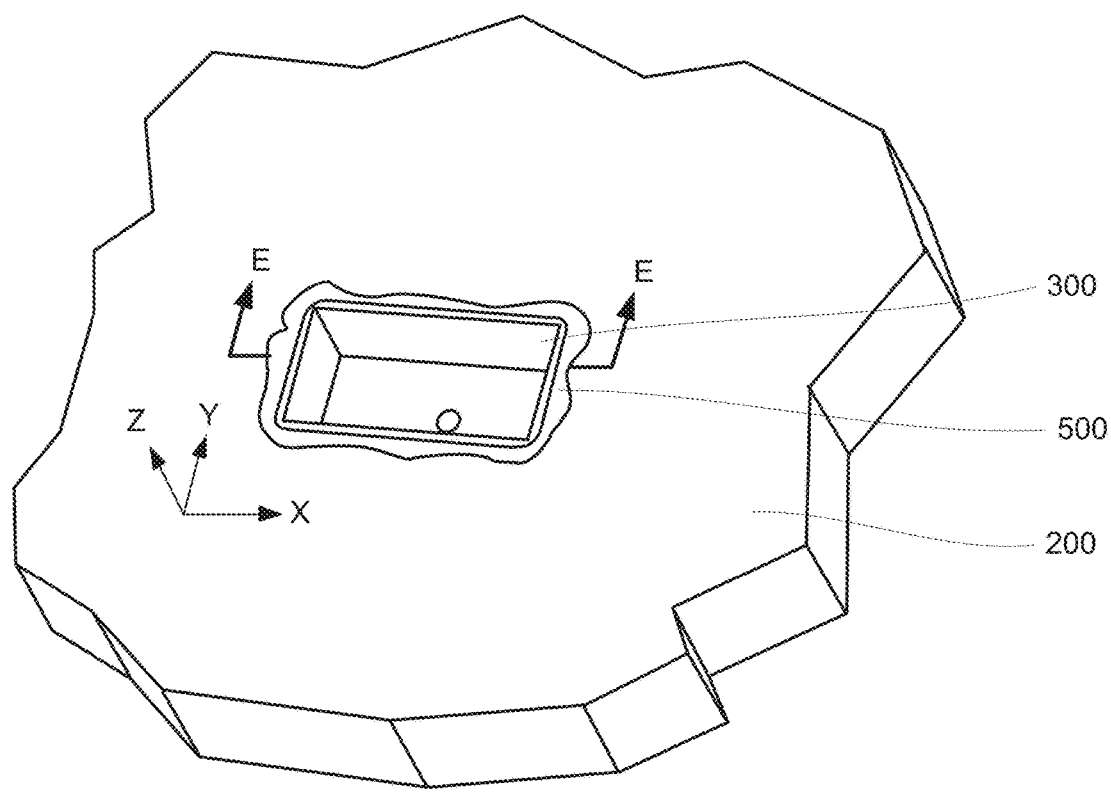
FIG. 5C is a perspective view of the slot case inserted into the slot of the first part with a space between the slot case and the first part being fully filled with the first adhesive, in accordance with some embodiments.

FIG. 5B is a section cut view of slot case 300 inserted into slot 210 of first part 200 with space between slot case 300 and first part 200 being fully filled with first adhesive 500, in accordance with some embodiments. Specifically, supplying first adhesive 500 into space 400 during operation 120 may comprises forcing first adhesive 500 through space 400 between slot case 300 and first part 200 and to top edge 340 of slot case 300. Top edge 340 of slot case 300 may coincide with surface 230 of first part 200 as, for example, shown in FIG. 5B and FIG. 5C.

Figure 5D:
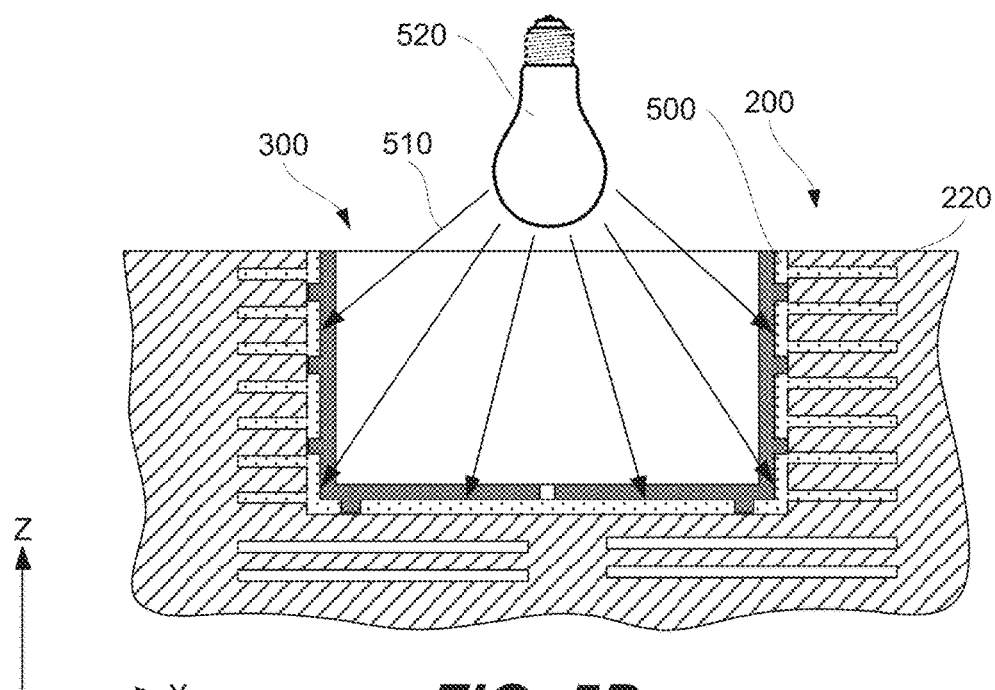
FIG. 5D is a section cut view of curing the first adhesive disposed in the space between the slot case and the first part, in accordance with some embodiments.

In some embodiments, method 100 further comprises curing first adhesive 500 during operation 126. Operation 126 may be performed prior to supplying second adhesive 700 into slot case 300 during operation 130. For example, curing first adhesive 500 may comprise transmitting UV radiation 510 through slot case 300 as, for example, shown in FIG. 5D. Slot case 300 may be transparent to UV radiation 510. Alternatively, first adhesive 500 and second adhesive 700 may be cured at same time, e.g., heat cured.

Second adhesive 600 may be different from first adhesive 500. Some examples of first adhesive 500 include, but not limited to, epoxies, polyurethanes, hot melts, and the like. Some examples of second adhesive 600 include, but not limited to, epoxies, polyurethanes, hot melts, and the like.

Figure 6:
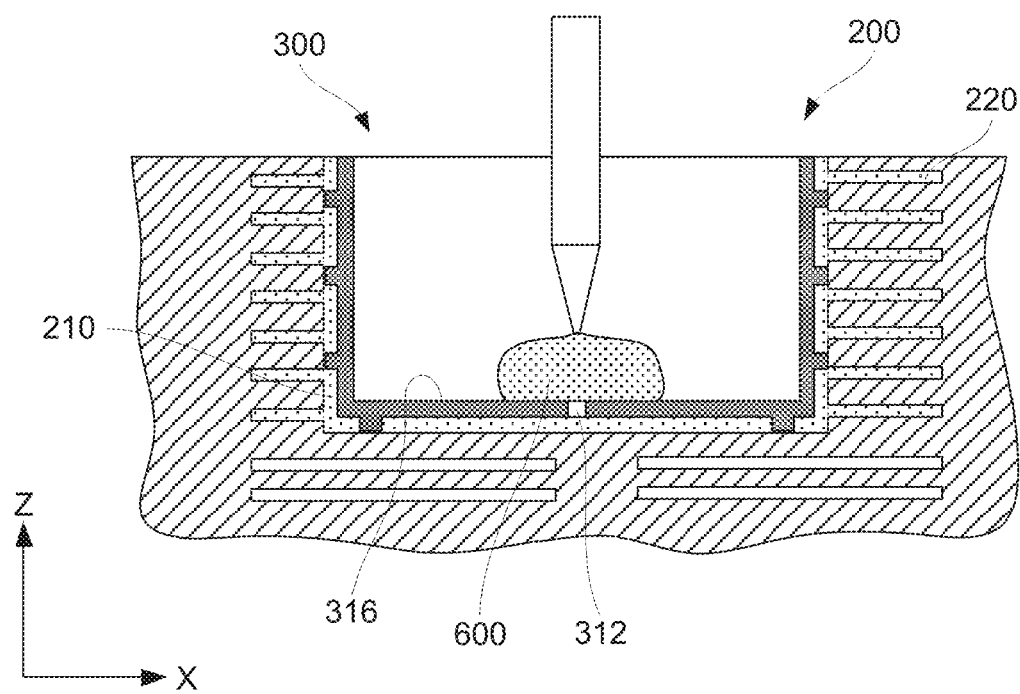
FIG. 6 is a section cut view of the slot case inserted into the slot of the first part with a second adhesive supplied onto the slot case, in accordance with some embodiments.

Method 100 may comprise supplying second adhesive 600 into slot case 300 during operation 130. Specifically, operation 130 may comprise supplying second adhesive 600 to inner bottom surface 316 of slot case 300 such as over fill port 312 of slot case 300 as, for example, shown in FIG. 6. The amount of second adhesive 600 may be set.

Figure 7A:
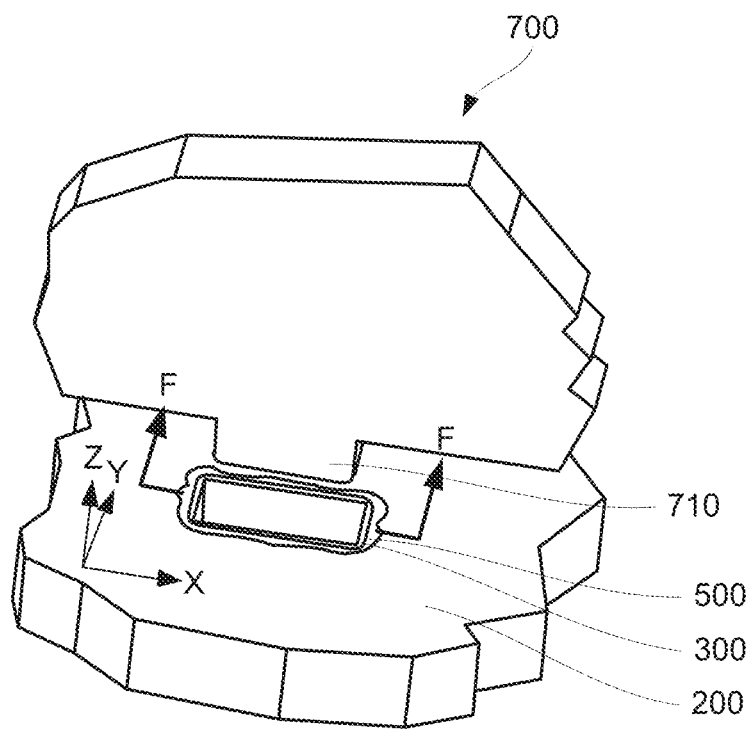
FIG. 7A is a perspective view of an assembly prior to inserting the second part into the slot case, in accordance with some embodiments.
Figure 7B:
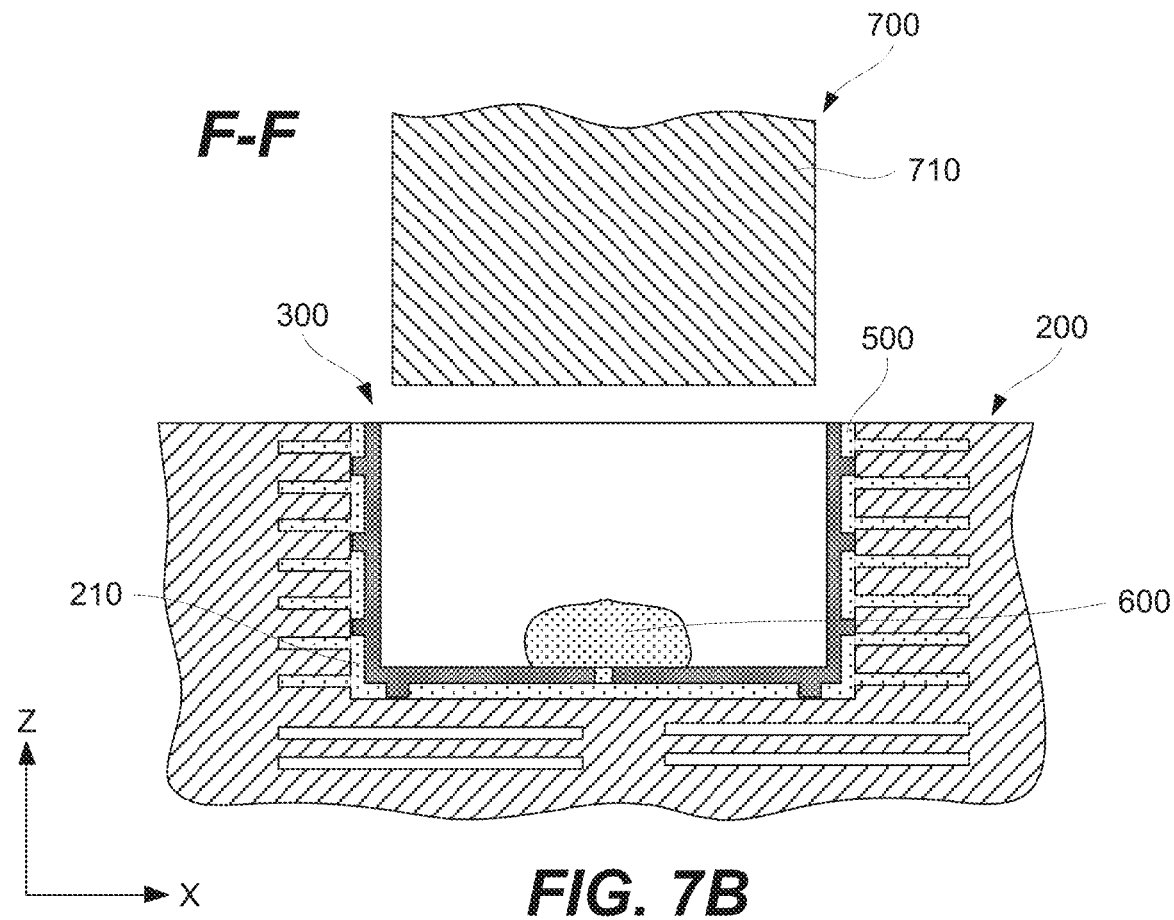
FIG. 7B is a section cut view of the assembly shown in FIG. 7A, in accordance with some embodiments.

Method 100 may comprise inserting tab 710 of second part 700 into slot case 300 during operation 148. FIG. 7A is a perspective view of an assembly prior to inserting the second part into the slot case, in accordance with some embodiments. FIG. 7B is a section cut view of the assembly shown in FIG. 7A, in accordance with some embodiments.

In some embodiments, operation 148 comprises distributing second adhesive 600 within in space 720 between tab 710 of second part 700 and slot case 300. For example, second adhesive 600 may flow from inner bottom surface 316 of slot case 300 to top edge 340 of slot case 300 reby filling entire space between tab 710 of second part 700 and slot case 300. In some embodiments, volume of second adhesive 600 supplied into slot case 300 is equal to volume of space 720 between tab 710 of second part 700 and slot case 300. Unlike the volume of first adhesive 500, the volume of second adhesive 600 is known precisely.

Figure 7C:
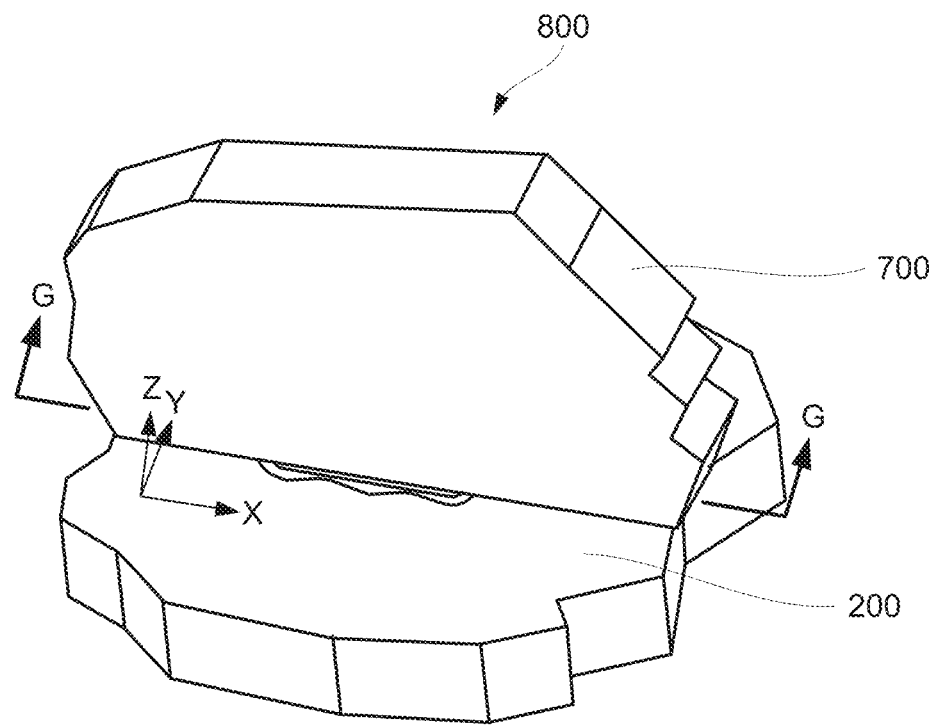
FIG. 7C is a perspective view of the assembly after inserting the second part into the slot case, in accordance with some embodiments.
Figure 7D:
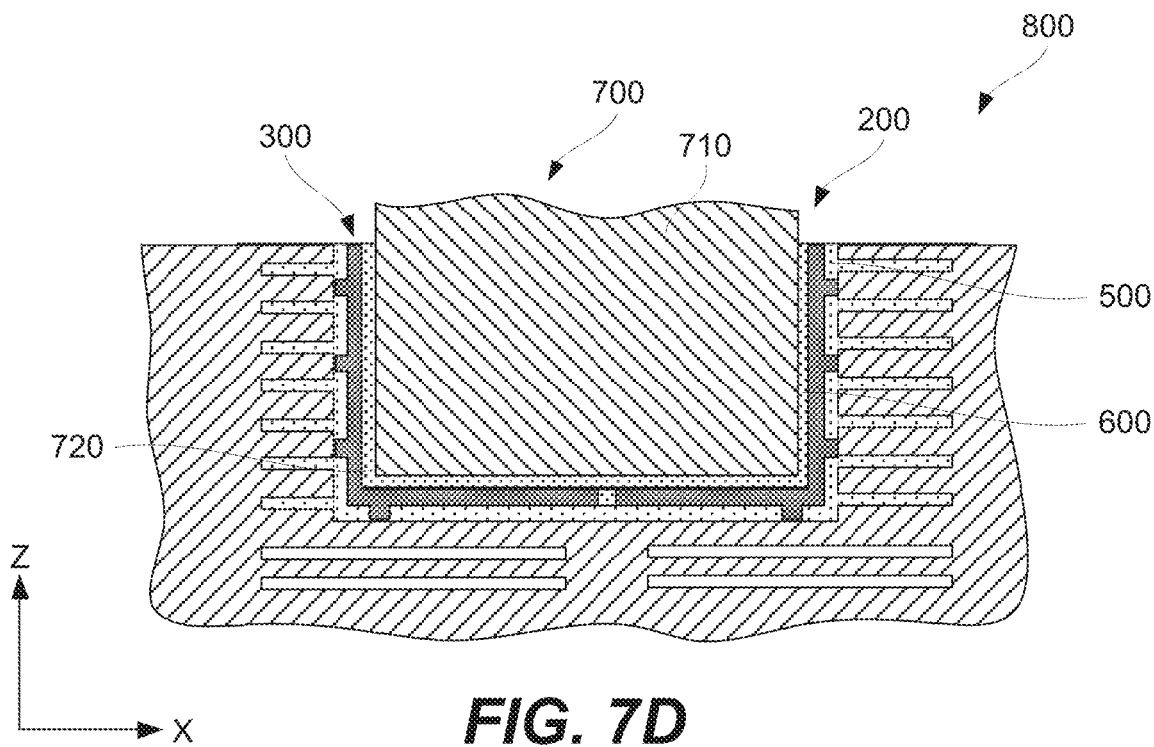
FIG. 7D is a section cut view of the assembly shown in FIG. 7C, in accordance with some embodiments.

FIG. 7C is a perspective view of assembly 800 after inserting second part 700 into slot case 300, in accordance with some embodiments. FIG. 7D is a section cut view of assembly 800 at this stage. Based on the description presented above, assembly 800 comprises first part 200, slot case 300, and first adhesive 500. First part 200 comprises slot 210, and slot case 300 is inserted into slot 210 of first part 200. First adhesive 500 is disposed in space 400 between first part 200 and slot case 300 and adheres first part 200 to slot case 300. In some embodiments, assembly 800 also comprises second part 700 comprising tab 710 inserted into slot case 300. Assembly 800 may also comprise second adhesive 600 disposed in space 720 between second part 700 and slot case 300. As noted above, first adhesive 500 may be different than second adhesive 600.

In some embodiments, first part 200 comprises pores 220. At least first portion 220a of pores 220 is filed with first adhesive 500. Second portion 220b of pores 220, which is different from first portion 220a, may be free from with first adhesive 500. First part 200 may have a material structure selected from group consisting of a honeycomb, a foam, and the like. In some embodiments, substantially all of space 400 between slot case 300 and first part 200 is filled with first adhesive 500. Filled space 400 includes first portion 220a of pores 220.

In some embodiments, bottom 310 of slot case 300 comprises fill port 312. Fill port 312 may be disposed in center 311 of bottom 310 of slot case 300. Slot case 300 may comprise bottom pads 320 contacting slot bottom surface 212 of slot 210. Slot case 300 may comprise a UV transparent material. Slot case 300 may comprise one or more protrusion 330 extending towards to a side surface 214 of slot 210.

Returning to FIG. 1, a set of operations 110 (i.e., inserting slot case 300), 120 (i.e., supplying first adhesive 500), 130 (i.e., supplying second adhesive 600), and 148 (i.e., inserting tab 710) is repeated at least once as shown by decision block 150. The volume of first adhesive 500 varies between different sets of these operations. At same time, the volume of second adhesive 600 remains constant in all sets of operations.

Examples of Aircraft and Methods of Fabricating and Operating Aircraft

Figure 8A:
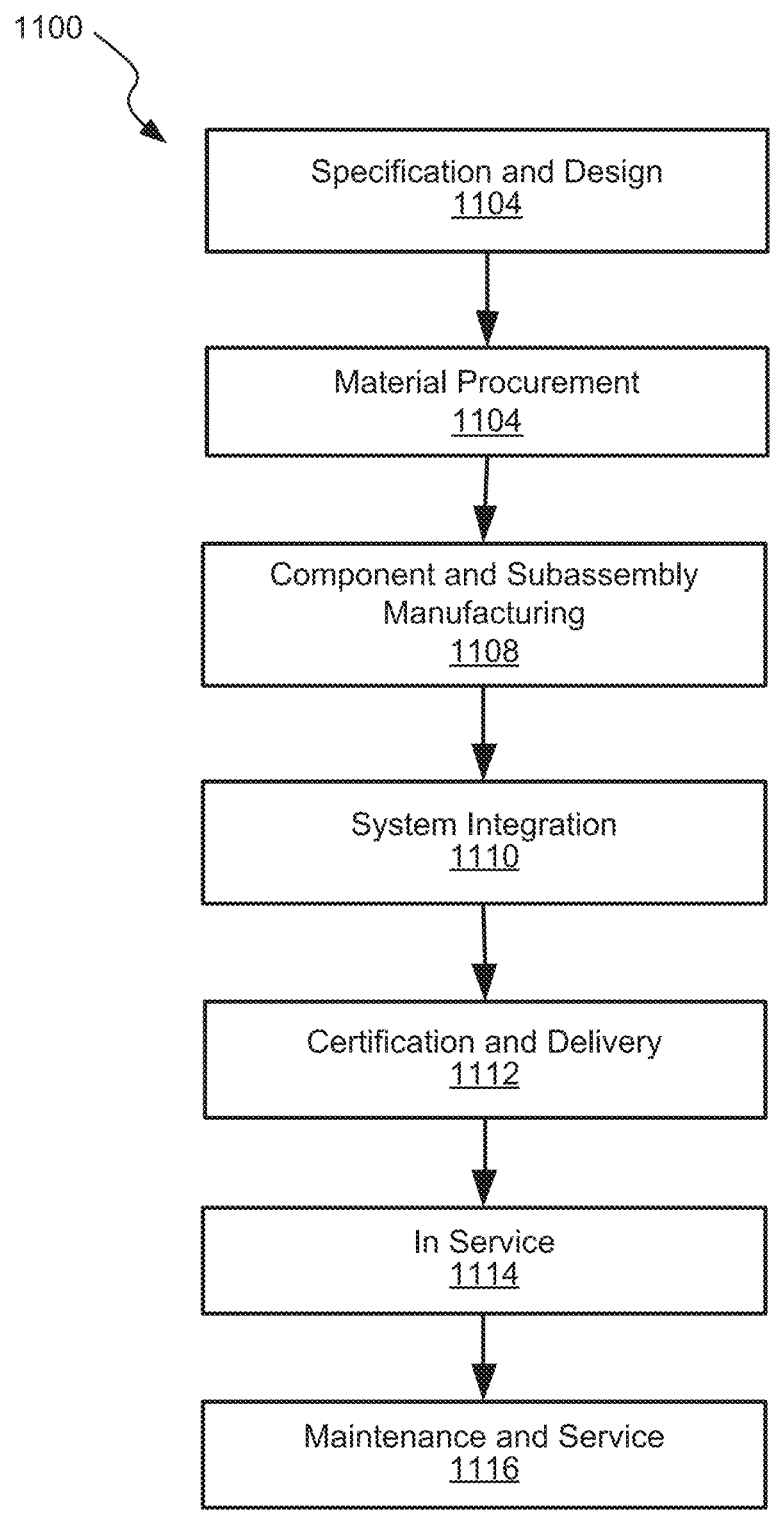
FIG. 8A is a block diagram of aircraft production and service methodology that may utilize methods and assemblies described herein.
Figure 8B:
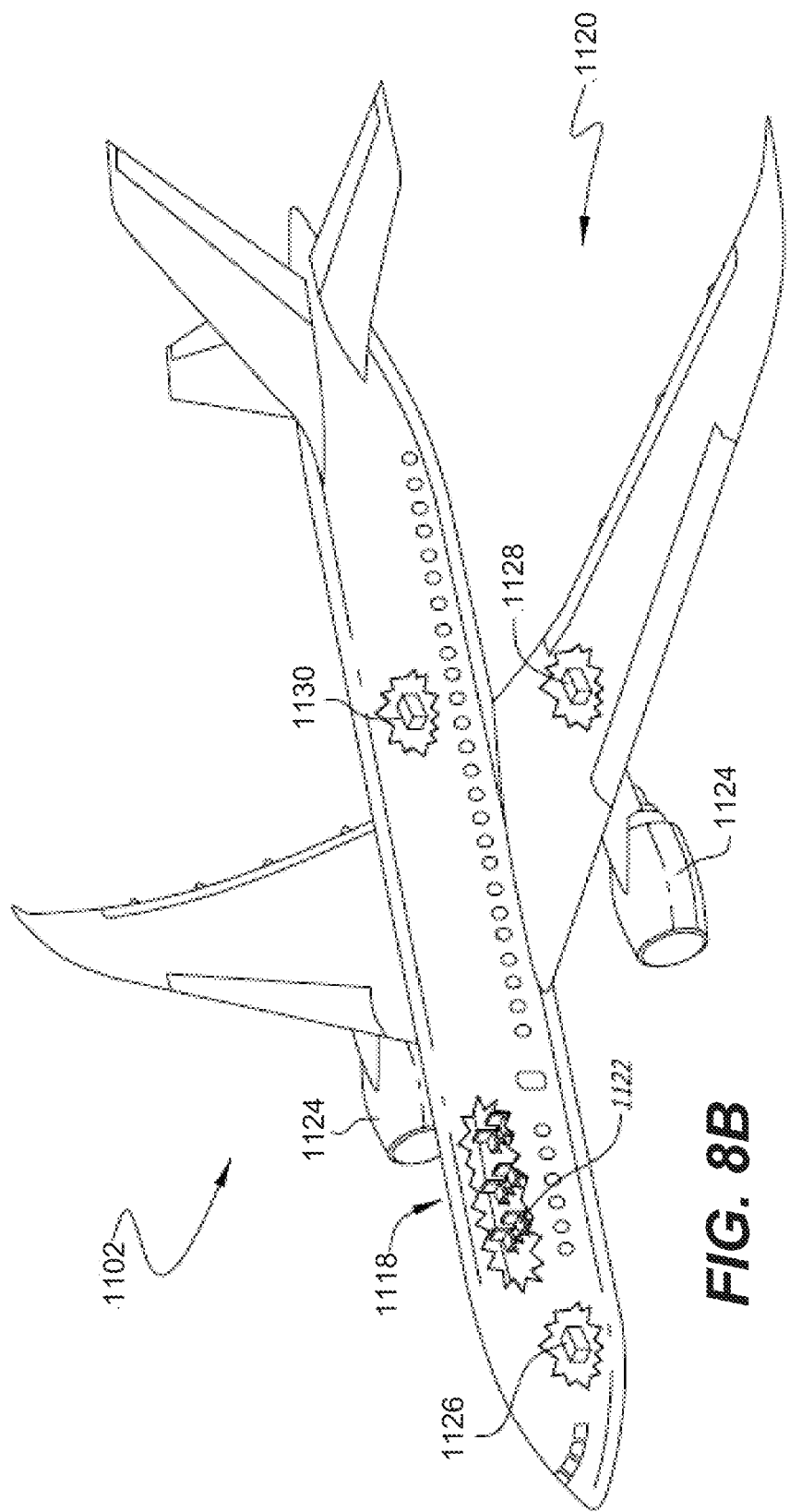
FIG. 8B is a schematic illustration of an aircraft that may include methods and assemblies described herein

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Described methods and assemblies formed by these methods and including slot cases can be used in any of specification and design (block 1104) of aircraft 1102, material procurement (block 1106), component and subassembly manufacturing (block 1108), and/or inspection system integration (block 1110) of aircraft 1102.

Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102. Described methods and assemblies formed by these methods and including slot cases can be used in any of certification and delivery (block 1112), service (block 1114), and/or routine maintenance and service (block 1116).

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level inspection systems 1120 and interior 1122. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An assembly comprising:
   a first part, comprising a slot and a first pore fluidically connected to the slot;
   a slot case, inserted into the slot of the first part, wherein the slot case comprises a case bottom and a bottom pad protruding from the case bottom and contacting a slot bottom surface of the slot to space the case bottom from a slot bottom portion of the slot; and
   a first adhesive, disposed in a space between the first part and the slot case and adhering the first part to the slot case.

2. The assembly of claim 1, further comprising:
   a second part, comprising a tab inserted into the slot case; and
   a second adhesive, disposed in a space between the second part and the slot case.

3. The assembly of claim 2, wherein the first adhesive is different than the second adhesive.

4. The assembly of claim 1, wherein at least a first portion of the first pore is filed with the first adhesive.

5. The assembly of claim 4, wherein a second portion of the first pore is free of the first adhesive.

6. The assembly of claim 1, wherein a bottom of the slot case comprises a fill port, and wherein the fill Dort is disposed in a center of the bottom of the slot case.

7. The assembly of claim 1, wherein the slot case comprises a first side protrusion extending towards a first side surface of the slot.

8. The assembly of claim 7, wherein the first side protrusion contacts the first side surface of the slot.

9. The assembly of claim 7, wherein the slot case further comprises a second side protrusion extending towards a second side surface of the slot different from the first side surface.

10. The assembly of claim 1, wherein substantially all of the space between the slot case and the slot and the first pore is filled with the first adhesive.

11. The assembly of claim 1, wherein the slot case comprises an alignment feature configured to orient the slot case in a first position relative to the first part.

12. The assembly of claim 11, wherein the alignment feature comprises a flange extending from a top edge of the slot case.

13. The assembly of claim 1, wherein the first part further comprises a second pore fluidically disconnected from the slot.

14. The assembly of claim 1, wherein the slot is a rectangular parallelepiped slot.

15. The assembly of claim 14, wherein the pore is separate from the rectangular parallelepiped slot.

16. An assembly comprising:
   a first part, comprising a slot and a first pore fluidically connected to the slot, wherein the first part is a material structure selected from the group consisting of a honeycomb and a foam;
   a slot case, inserted into the slot of the first part; and
   a first adhesive, disposed in a space between the first part and the slot case and adhering the first part to the slot case.

17. The assembly of claim 16, wherein the first part is a honeycomb structure, and wherein the first pore is a cell of the honeycomb.

18. An assembly comprising:
   a first part, comprising a slot and a first pore fluidically connected to the slot;
   a slot case, inserted into the slot of the first part, wherein the slot case comprises a slot side wall and a first side protrusion extending from the slot side wall towards a first side surface of the slot, and wherein the slot side wall is configured to space the slot side wall from the first side surface of the slot; and
   a first adhesive, disposed in a space between the first part and the slot case and adhering the first part to the slot case.

19. The assembly of claim 18, wherein the first side protrusion contacts the first side surface of the slot.

20. An assembly comprising:
   a first part, comprising a slot and a first pore fluidically connected to the slot;
   a slot case, inserted into the slot of the first part, wherein the slot case comprises a UV transparent material; and
   a first adhesive, disposed in a space between the first part and the slot case and adhering the first part to the slot case.

* * * * *